United States Patent
Takahashi

(10) Patent No.: US 7,002,625 B2
(45) Date of Patent: Feb. 21, 2006

(54) IMAGE PICKUP APPARATUS FOR RECORDING A PHOTOGRAPHED IMAGE IN A DIRECTORY

(75) Inventor: Kazuhiro Takahashi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 679 days.

(21) Appl. No.: 09/989,867

(22) Filed: Nov. 20, 2001

(65) Prior Publication Data

US 2002/0076220 A1    Jun. 20, 2002

(30) Foreign Application Priority Data

Nov. 24, 2000    (JP)    ............................. 2000-357048

(51) Int. Cl.
*H04N 5/76*    (2006.01)

(52) U.S. Cl. .................................. 348/231.2; 700/200

(58) Field of Classification Search ............ 348/231.2, 348/231.3; 707/200, 201
See application file for complete search history.

(56) References Cited

U.S. PATENT DOCUMENTS

| | | | | | |
|---|---|---|---|---|---|
| 5,862,218 | A | * | 1/1999 | Steinberg | 713/176 |
| 6,023,241 | A | * | 2/2000 | Clapper | 342/357.13 |
| 6,133,947 | A | * | 10/2000 | Mikuni | 348/143 |
| 6,408,301 | B1 | * | 6/2002 | Patton et al. | 707/102 |
| 6,437,797 | B1 | * | 8/2002 | Ota | 345/638 |
| 6,462,778 | B1 | * | 10/2002 | Abram et al. | 348/239 |
| 6,539,380 | B1 | * | 3/2003 | Moran | 707/9 |
| 6,657,661 | B1 | * | 12/2003 | Cazier | 348/231.2 |
| 2002/0054224 | A1 | * | 5/2002 | Wasula et al. | 348/232 |

* cited by examiner

Primary Examiner—David L. Ometz
Assistant Examiner—Hung Lam
(74) Attorney, Agent, or Firm—Cowan, Liebowitz & Latman, P.C.

(57) ABSTRACT

An image pickup apparatus, which is a device for recording an image file on a recording medium according to a file system having a plurality of directories including attributes associated with a photographing position of image data and a photographer, detects the photographing position of a photographed image data and the photographer and records the image file on the directory of the attributes corresponding to the detected photographing position and the photographer from among said plurality of directories.

5 Claims, 12 Drawing Sheets

IMAGE PICKUP APPARATUS FOR RECORDING A PHOTOGRAPHED IMAGE IN A DIRECTORY

BACKGROUND OF THE INVENTION

1. Field of the Invention

The present invention relates to an image pickup apparatus and, more in particular, to a device for recording a photographed image in a directory.

2. Related Background Art

At present, in the image pickup apparatus such as a video camera and a digital still camera, the photographed image is generally recorded in a recording medium which is built in or mounted on a camera main body as a digital data file. Since there are many opportunities where the recorded image data is not only reproduced by the camera main body, but also transmitted to a personal computer (PC) or external peripheral equipment or the like so as to be managed and utilized, the same file format as adopted in the PC is generally adopted for a file format of the recording medium.

According to Design rule for Camera File system (hereinafter as DCF), for example, as shown in FIG. 12, under the directory by a fixed name of "DCIM", the directory by the name of "100ABCDE", which is characteristic of each equipment, is prepared, and under this directory, the photographed image file by the name such as "IMG_0001.JPG" or the like is subsequently recorded.

The amount of the image data increases according to an image size and an image quality. On the other hand, with the advancement of semiconductor technology, the recording amount of the recording medium has rapidly increased. For example, even in the case of a card type recording medium, those having a storage capacity of 64 M (mega) byte and 128 M byte have been put on the market. Assuming that the amount of an image data per one sheet is 200 K (kilo) byte, in the case of the recording medium having 128 M byte, a total of 640 sheets of the image can be recorded. Further, in the case of a hard disc type recording medium, there are those having several G (giga) byte.

When the recording amount of the recording medium increases in such a manner, since the number of files recorded in one recording medium increases, in a file constitution shown in FIG. 12, the number of files stored in one directory extremely increases. Even if a new directory is prepared for every fixed number of images and subsequent files are recorded in the new directory, the number of directories would increase.

In this way, in the case where the directory name and the image file name are automatically decided inside the camera according to the file constitution of FIG. 12, when the number of the directories and the number of image files increase, it is not possible to grasp the contents of the directory or the contents of the image file by just looking at the directory name or the file name. In order to confirm the contents of the image file, there is no way but to reproduce the file, and a reproducing unit is thus required. Accordingly, when those image files are put in order and classified in the future, fairly complicated works are required.

The photographing date can be confirmed by a time stamp attached to the directory and the file. However, it is not possible to grasp where and by whom the photograph is taken. For example, in Japanese Laid-Open Patent Application No. 11-164234, there is disclosed an electronic camera in which a directory including a name as well as a photographing date is newly prepared according to a certain operation.

In order to more easily put in order and classify the photographed files, an operator may prepare the directory of an arbitrary name and record the photographed image files under the directory. However, in recent years, the electronic camera has been downsized and a space for arranging an operation switch or an operation panel for preparing the directory has been fairly restricted, and therefore users are rather put in a position to go through rather complicated operations.

Further, in the information society connected through networks by Internets or the like, security problems of the data owned by an individual becomes more serious according to an increase in the capacity of the storage medium.

SUMMARY OF THE INVENTION

An object of the present invention is to solve the problems as described above.

Another object of the present invention is to make it possible to easily put in order and classify the photographed images.

Under those objects, the present invention, presents as one aspect of the embodiment, an image pickup apparatus, comprising:

image pickup means;

recording means for recording an image file containing image data on a recording medium according to a file system having a plurality of directories comprising attributes correlating to photographing positions of image data;

position detection means for detecting a photographing position of a first image data obtained by the image pickup means; and control means for controlling the recording means so as to record the image file containing the first image data on the directory of the attribute corresponding to the photographing position detected by the position detection means from among the plurality of directories.

Another object of the present invention is to make it possible to effectively prevent an unintended leakage of the photographed images.

An object and a characteristic of the present invention other than the above described will be apparent from the following detailed description of the modes of the present invention with reference to the accompanied drawings.

DETAILED DESCRIPTION OF THE PREFERRED EMBODIMENTS

The embodiments of the present invention will be described below with reference to the drawings.

Figure 1:
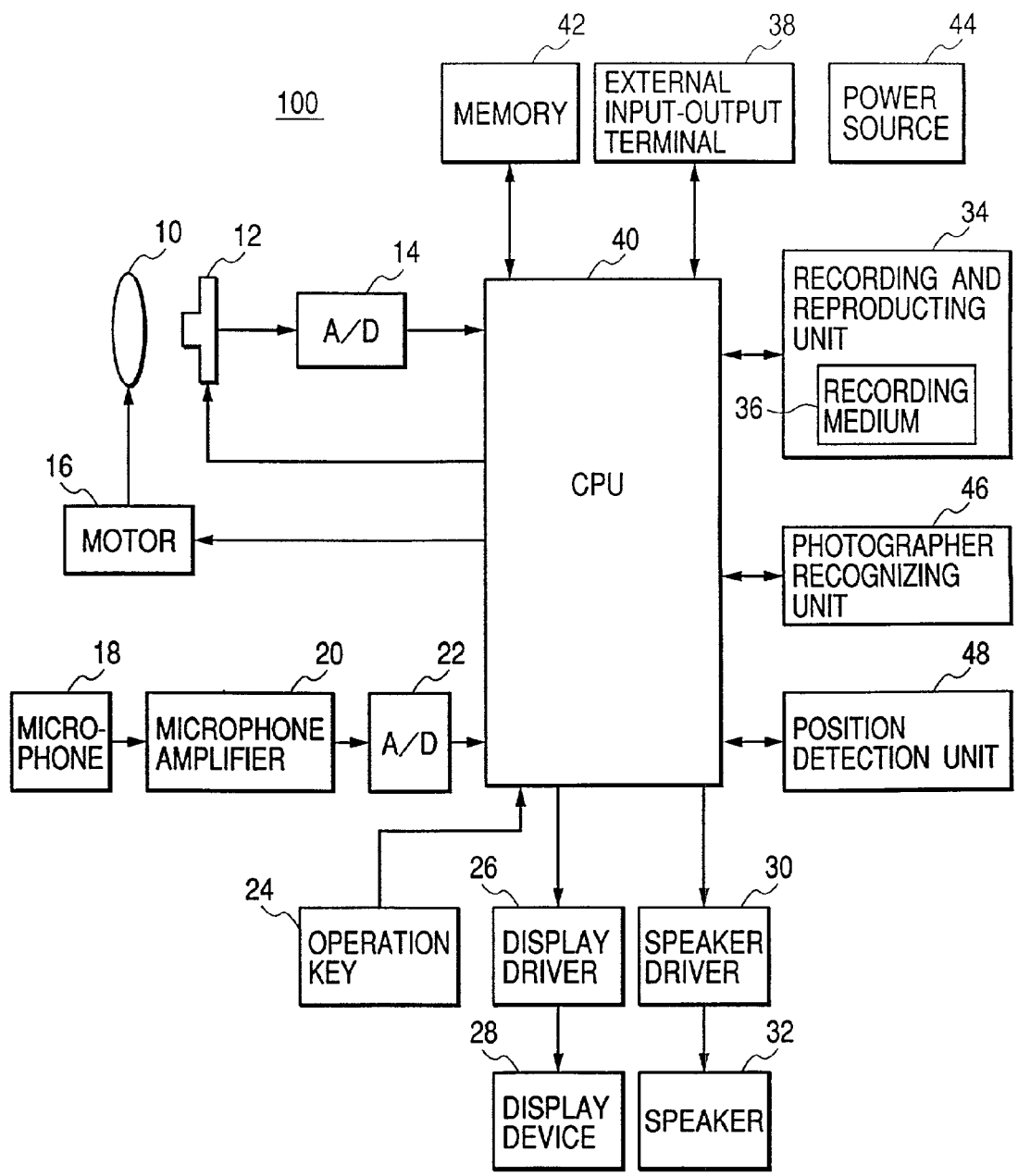
FIG. 1 is a schematic block diagram according to one embodiment of the present invention.

FIG. 1 is a block diagram showing a configuration of an image pickup apparatus 100 to which the present invention is applied.

In FIG. 1, reference numeral 10 denotes a photographic lens, reference numeral 12 an image pickup element for converting an optical image by the photographic lens 10 to an electrical signal, numeral reference 14 an A/D converter for converting an analogue output of the photographic element 12 to a digital signal, reference numeral 16 a motor for driving the photographic lens 10, reference numeral 18 a microphone for taking in speeches, reference numeral 20 an microphone amplifier for amplifying an output of the microphone 18, reference numeral 22 an A/D converter for digitalizing an analogue output of the microphone amplifier 20, reference numeral 24 an operation key, reference numeral 26 a display driver for allowing an image to be displayed in a display device 28 according to an image data, and reference numeral 30 a speaker driver for driving a speaker 32 according to a sound signal.

Reference numeral 34 denotes a recording and reproducing unit, and reference numeral 36 denotes a recording medium. As the recording medium 36, a various types of semiconductor memories, optical disks, optical magnetic disks, magnetic disks or the like can be utilized. Reference number 38 an input-output terminal for inputting and outputting various information between the image pickup apparatus and external equipment, reference numeral 40 a CPU for controlling the whole system, reference numeral 42 a memory utilized by the CPU 40, reference numeral 44 a power source, reference numeral 46 a photographer recognizing unit which recognizes a photographer's eyes, fingerprint, voiceprint, posture or the like, and reference numeral 48 a position detection portion for detecting a position on the earth of an image pickup apparatus 100 of the present embodiment.

Figure 2:
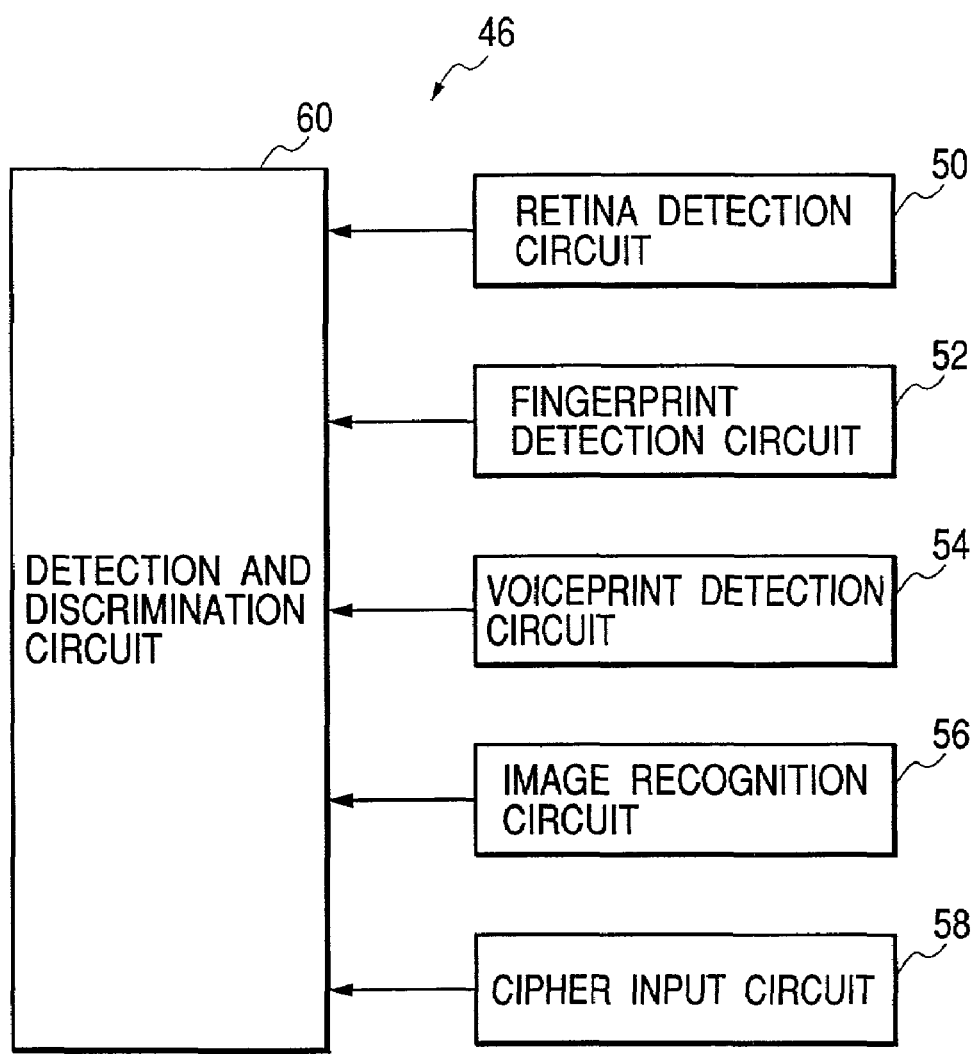
FIG. 2 is a schematic block diagram of a photographer recognizing unit.

FIG. 2 is a block diagram showing a schematic configuration of the photographer recognizing unit 46.

As shown in FIG. 2, the photographer recognizing unit 46 comprises a retina detection circuit 50, a fingerprint detection circuit 52, a voiceprint detection circuit 54, an image recognition circuit 56, a cipher input circuit 58 and a detection and discrimination circuit 60 for detecting or discriminating outputs of the other circuits described above.

Figure 3:
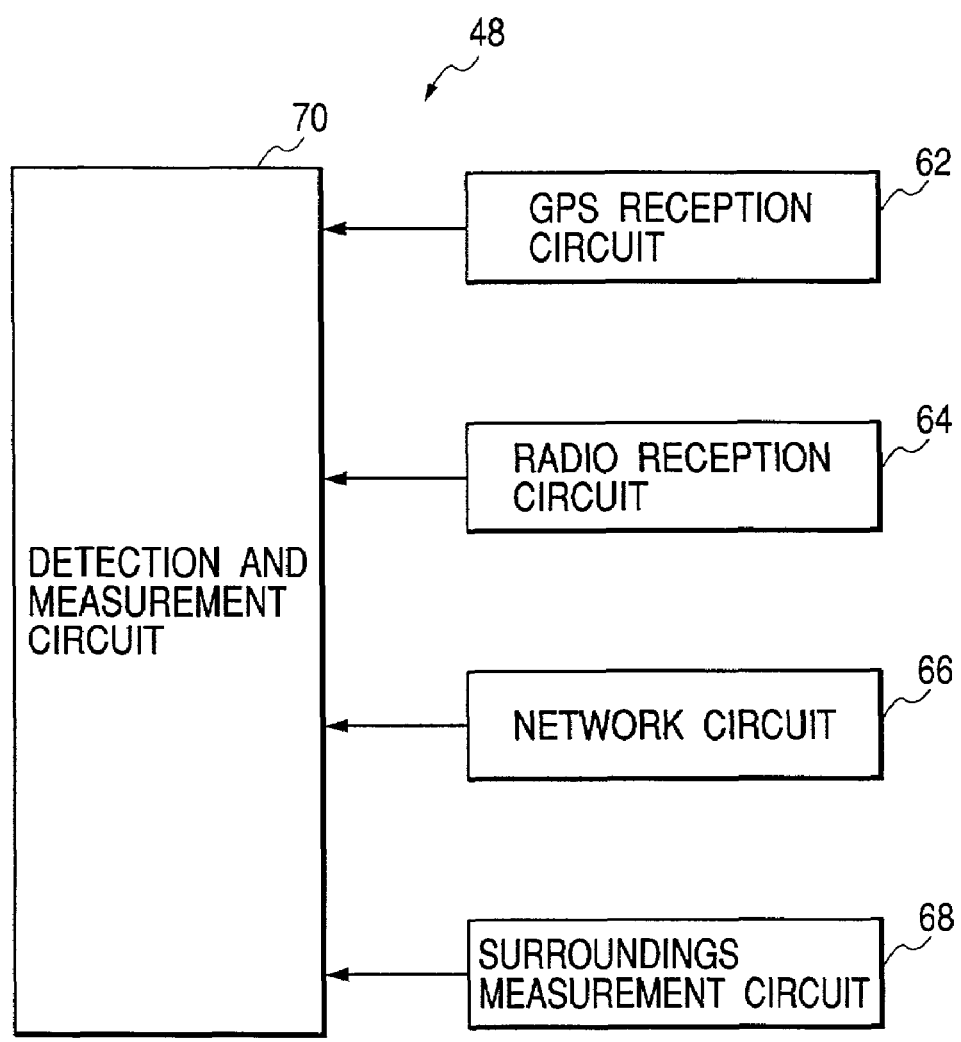
FIG. 3 is a schematic block diagram of a position detection unit.

FIG. 3 is a block diagram for showing a schematic configuration of the position detection portion 48.

As shown in FIG. 3, the position detection portion 48 comprises a GPS (Global Positioning System) reception circuit 62, a radio reception circuit 64, a network circuit 66, a surroundings measurement circuit 68 and a detection and measurement circuit 70 for detecting or measuring outputs of the other circuits described above.

Next, the operation of the image pickup apparatus 100 shown in FIG. 1 will be described below.

The image pickup element 12 converts an optical image from the photographic lens 10 to an electric signal, and the output thereof is converted to a digital signal by the A/D converter 14 and is outputted to the CPU 40. The photographic lens 10 is provided with an autofocusing function and a zooming function. The CPU 40 controls the focusing and the zooming of the photographic lens 10 by the motor 16. The CPU 40 also supplies a signal output timing to the image pickup element 12.

A microphone 18 takes in surrounding speeches. The output of the microphone 18 is amplified by a microphone amplifier 20 and is outputted to the CPU 40 by being sampled and digitalized by an A/D converter 22.

The CPU 40 performs basic processes such as color separation, white balance adjustment, gamma correction, aperture correction or the like and additional processes such as an image size being set by the operation key 24, an image quality adjustment, a position adjustment or the like on the image data inputted from the A/D converter 14 and compresses the information thereof according to the preset compression method and compression parameter. The CPU 40 also performs additional processes such as adjustment of the sound set by the operation key 24 or the like on the sound data from the A/D converter 22 and compresses the information thereof according to the preset compression method and compression parameter.

In this way, the image compression data and the sound compression data obtained by the CPU 40 are outputted to the recording and reproducing unit 34 as a recording data together with a control data. Here, the control data includes, for example, the information of the image pickup apparatus itself, the recording setting up information of an image, speech and the like and an additional information such as photographic environment or the like. The control data may include the information of the photographer and a photographing position detected by the photographer recognition portion 46 and the position detection portion 48.

At the time of recording, the recording and reproducing unit 34 writes as a file a data from the CPU 40 into the recording medium 36 under the control of a file system and, at the time of reproducing, reads a designated data from the recording medium 36. The file system comprises a management information for managing the file, and a file data. By making the file system common, the recording data can be used in common between different recording media or recording and reproducing units. Note that, in the present embodiment, one sheet (one frame) image data and speech data relative to this image data and control data form one file.

The CPU 40 supplies a recording data to the external input-output terminal 38 as occasion arises and, further, as a confirmation, supplies it to a display portion 28 through a display driver 26 so as to display it as an image. The power source 44 supplies an electric power necessary to each circuit block.

The photographer recognizing portion 46 is a circuit block which recognizes and specifies a photographer. The retina detection circuit 50 compares retina image information of the photographer obtained from the image pickup apparatus 100 itself of the present embodiment or other image input device with an individual retina information loaded from a memory 42 or the outside so as to specify the photographer. The fingerprint detection circuit 52 detects a fingerprint of the photographer and compares it with an individual fingerprint information loaded from a memory 42 or the outside so as to specify the photographer. The voiceprint detection circuit 54 compares a voiceprint of the photographer obtained from a microphone 18 with an individual voiceprint information loaded from the memory 42 or the outside so as to specify the photographer.

The image recognition circuit 56 compares an image information of the photographer obtained from the image pickup apparatus 100 itself of the present embodiment or other image input device with an individual image information loaded from a memory 56 or the outside so as to specify the photographer. The cipher input circuit 58 compares a code inputted from a operation key 24 by the photographer and a certified code which is characteristic of the image pickup apparatus, so as to certify the photographer. A detection/discrimination portion 60 discriminates a photographer based on each detection result of the retina detection circuit 50 to the cipher input circuit 58 and outputs the discrimination result to the CPU 40.

In the present embodiment, though the detection/discrimination circuit 60 uses selectively or combines a method of discriminating each detection result of the retina detection circuit 50 to the cipher input circuit 58 under a predetermined weight and a method of selecting the each detection result under a predetermined condition, each detection result may be directly inputted to the CPU 40.

The position detection portion 48 detects and measures a position of a terrestrial coordinate system of the image pickup apparatus 100 of the present invention. A GPS reception circuit 62 is the well-known circuit in which radio wave signals transmitted from a plurality of satellites are received and measured so as to specify a position on the earth. The radio reception circuit 64 receives and measures a signal or a specified electric wave emitted from a specified radio station so as to specify a position. The network circuit 66, when connected to a fixed network, specifies the position referred to in the present embodiment from network information. The surroundings measurement circuit 68 specifies a height above sea level, an area or the like from an environment sensor such as temperature, atmospheric pressure, humidity or the like. The detection/measurement circuit 70 detects and measures a signal outputted from each circuit and supplies the detection and measurement result to the CPU 40.

Although the detection/measurement circuit 70 uses selectively or combines a method of measuring each measurement result from the GPS reception circuit 62 to the surroundings measurement circuit 68 under a predetermined weight and a method of selecting each measurement result under a predetermined condition, each result may be directly inputted to the CPU 40.

In the file system of the present invention, the recording and reproducing unit 34 is controlled by the CPU 40 to prepare a large number of directories on the storage medium 36, and each image information and sound information are stored under these directories. When photographic instructions by the operation key 24 are received, the CPU 40 confirms the contents of the directories already prepared on the storage medium 36 and records the prepared file in the directory correlative with the position information measured by the position detection portion 48.

Further, when the directory having high correlation with the measured position information does not exist on the recording medium 36, the CPU 40 newly prepares a directory having high correlation with this photographing position based on the position measured by the position detection portion 48, and records the image file under this new directory. What is meant by the correlated directory is a directory which groups absolute positions such as latitudes, longitudes or the like within a predetermined range, a directory which groups areas information, a directory which groups facilities information, a directory which groups topographies such as height above sea level or the like and a directory which groups environment such as temperature, humidity or the like.

Figure 4:
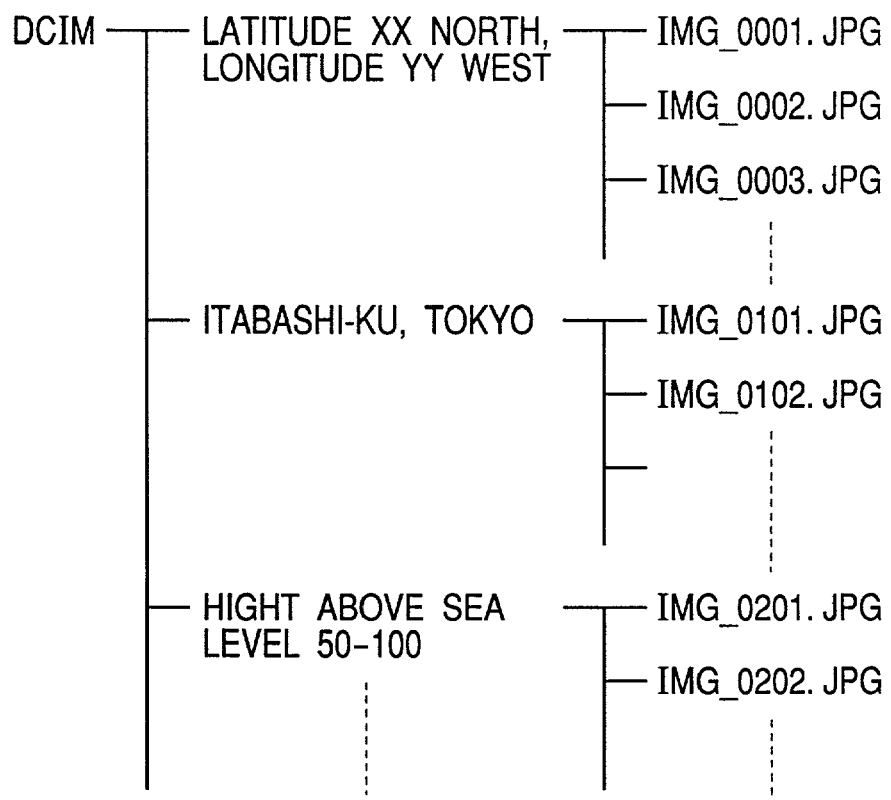
FIG. 4 is a directory example of the present embodiment.

One example of the directory structure correlative to the position is shown in FIG. 4. The CPU 40 confirms the directory on the storage medium 36 and, when there exist directories having the names such as LATITUDE XX NORTH, LATITUDE YY WEST (XX denotes 10 to 20 or the like), ITABASHI-KU, TOKYO, HIGH ABOVE SEA LEVEL 50 to 100 or the like, the image file is recorded in the directory to which the position measured by the position detection portion 48 corresponds.

Further, when there exists no corresponding directory, a directory having the name attached with numerical values or area items of the name following the preset directory attribute items (for example, latitudes, areas, height above sea levels, environment or the like) is automatically prepared, and the image file is recorded under this directory. When there is no directory having the corresponding name, the image file is recorded in a general-purpose directory such as "\UNKNOWN", or the image file may be recorded by forming a directory according to a stipulated rule such as a DCF format.

When the image and sound files stored in such a manner are reproduced, users operate the operation key 24 so as to display a menu screen on the display portion 28, and display a list of directories on the storage medium 36 by using this menu screen. When the CPU 40 is instructed to display a list of the directories by the operation key 24, it reads the information of all the directories on the recording medium 36 by controlling the recording and reproducing unit 34, and displays a list of the directories on the display portion 28 by controlling the display driver 26. In this way, it is possible for a user to easily confirm under which directory the image and sound information which the user seeks are stored.

Figure 5:
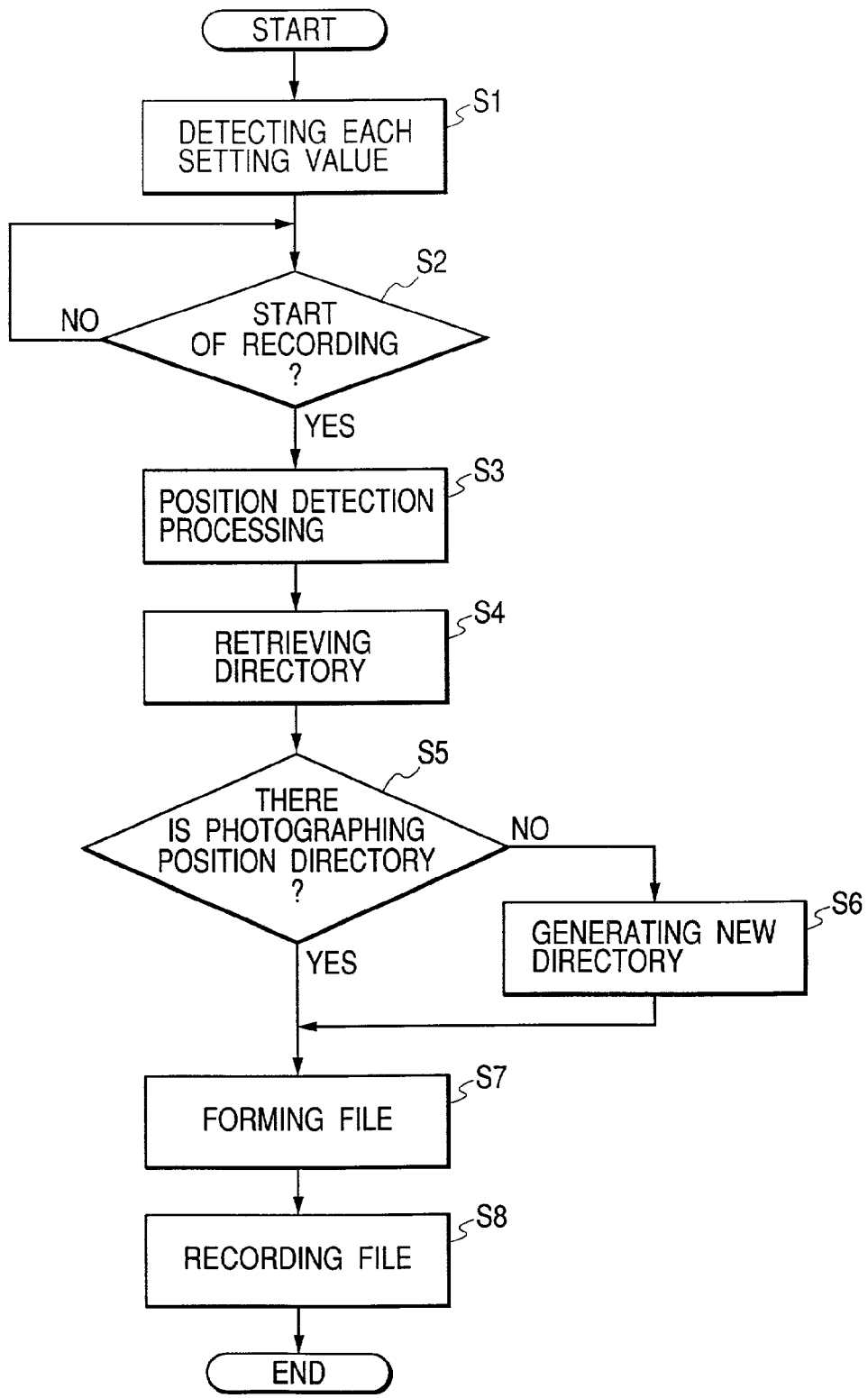
FIG. 5 is an operational flowchart of the present embodiment.

FIG. 5 is a flowchart showing a control operation of the CPU 40 in the image pickup apparatus 100 of the present embodiment as described above.

In FIG. 5, various setting values relative to the photographing operation are detected (S1), and the start of the photographing is awaited (S2). When the instruction to start the photographing is received (S2), the position of the image pickup apparatus 100 is measured (S3), and the directory information of the recording medium 36 is obtained (S4). The position information and the directory information are compared with each other (S5), and when there exists a directory having high correlation, the image file is recorded under this directory (S7, S8), and when there exists no such directory, a directory having the name associated with the photographing position as described above is newly prepared (S6), and the image file is recorded under this directory (S7, S8).

In this way, according to the present embodiment, the image file is recorded under the directory having high correlation with the position information of the photographing time and, when there exists no directory having high correlation with the position information of the photographing time in the recording medium, a directory having high correlation is automatically prepared and the image file is recorded under this directory and therefore users can grasp the content of each file by just confirming the directory name. For this reason, the operability is improved and, at the same time, the management of the photographed image and editing operation are made easy.

Figure 6:
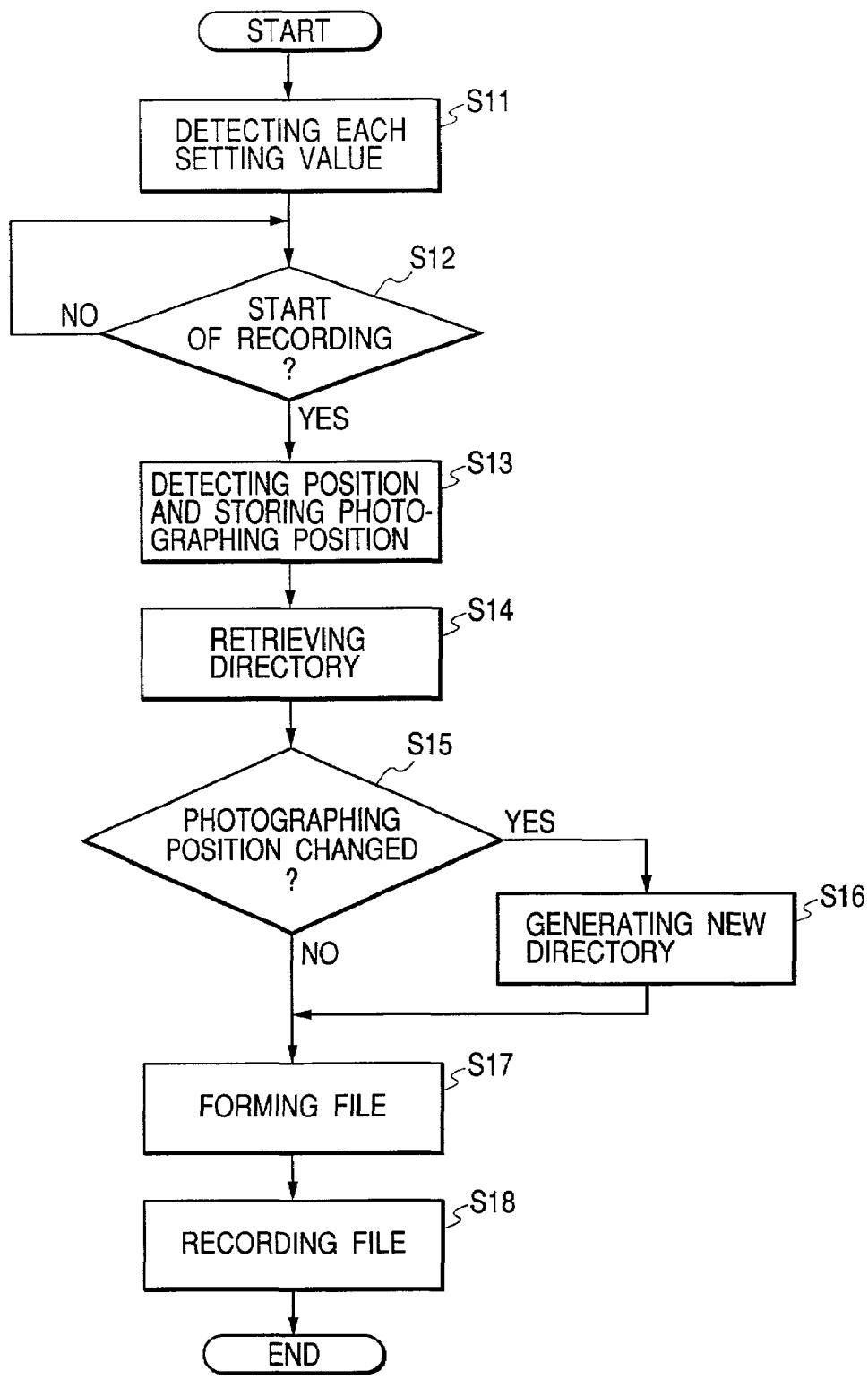
FIG. 6 is the operational flowchart of the present embodiment.

FIG. 6 is another operational flowchart by the CPU 40 of the image pickup apparatus 100. In the operations shown in FIG. 6, the change in the photographing position is monitored, and a new directory is automatically prepared for the movement of more than a constant amount.

In FIG. 6, setting values are detected (S11), and the start of photographing is awaited (S12). When the instruction to start the photographing is received (S12), the position of the image pickup apparatus according to the present embodiment is measured and is simultaneously recorded in a memory (S13), the information of the directory is obtained (S14) in which the file recorded immediately before among each file recorded in the recording medium 36 is recorded. This operation is a preparation for obtaining a file management information on the recording medium 36 in order to prepare the next file. Based on the information of the photographing position included in the control data of the file recorded immediately before, the preceding photographing position and the present photographing position are compared with each other (S15) and, when the amount of the movement is below a predetermined value, the image file is recorded under the same directory as before (S17, S18) and, when the amount of the movement is more than a predetermined value, a directory having the name associated with the photographing position is newly prepared (S16), and the image file is recorded under this directory (S17, S18).

For the discrimination of the amount of the movement, an absolute position movement amount may be used or an accumulated measured amount of a continuous movement amount of the image pickup apparatus 100 may be used.

In the operations example shown in FIG. 6, accompanied with the movement of the image pickup apparatus 100, a directory is automatically prepared. For this reason, the operability is improved and the management of the photographed image and the editing operation are made easy.

Figure 7:
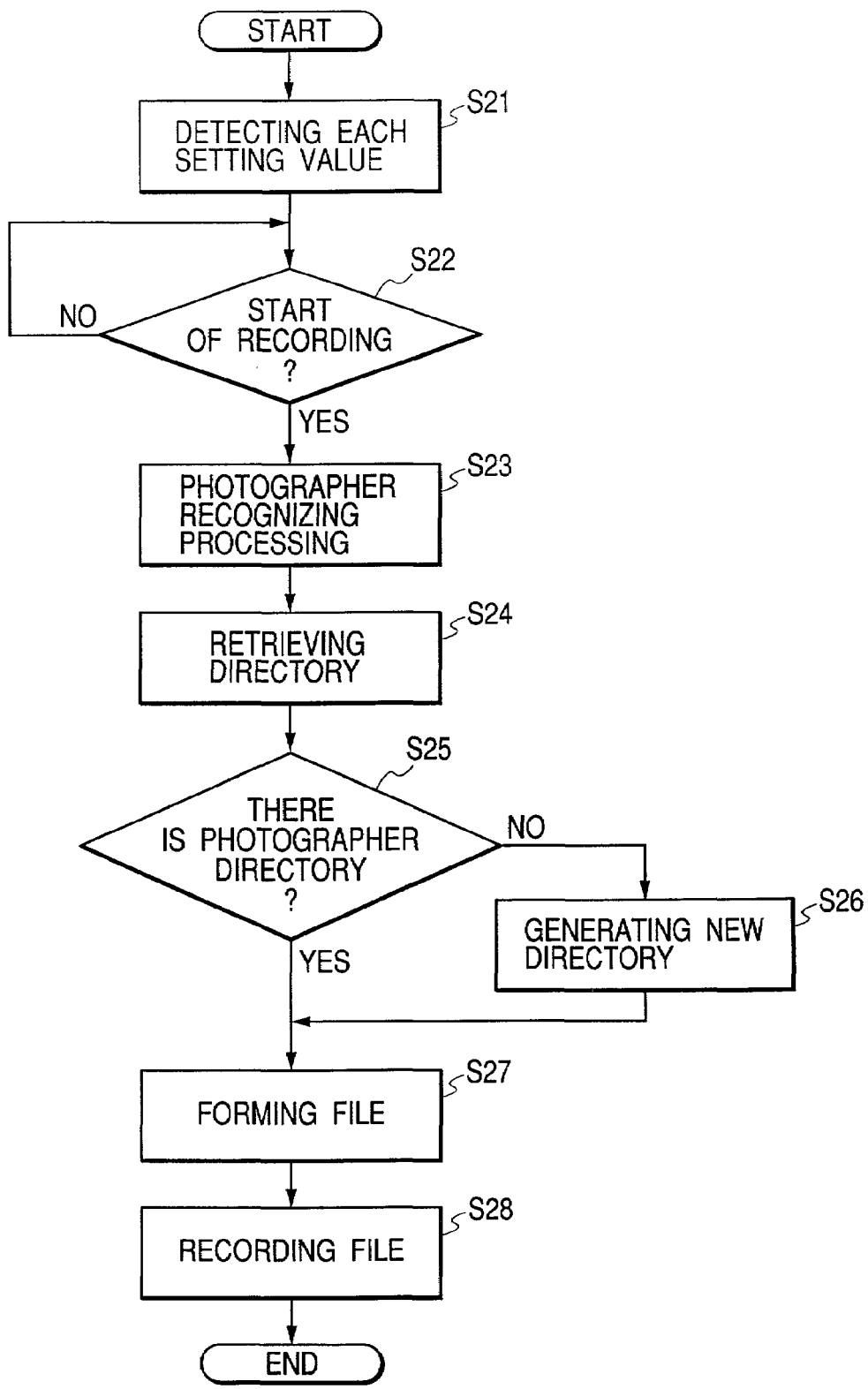
FIG. 7 is the operational flowchart of the present embodiment.

Next, another operation by the image pickup apparatus 100 of the present embodiment will be described below. FIG. 7 is another operational flowchart of the CPU 40 in the image pickup apparatus 100. In the operation of FIG. 7, a different directory is prepared for each photographer and the image file is recorded accordingly. In this way, even when the image pickup apparatus 100 is used by a plurality of users, each image file can be simply recognized as to by whom it was photographed and therefore the management of the photographed image file can be easily made.

In FIG. 7, setting values are detected (S21), and the start of the photographing is awaited (S22). When the instruction to start the photographing is received (22), the photographer is recognized and specified by a photographer recognizing portion 46 (S23). Next, the directory information of the recording medium 36 is obtained (S24), and whether the directory of the specified photographer exists or not is checked (S25). When the directory of the specified photographer exists, the image file is recorded under this directory (S27, S28) and, when no such directory exists, a directory of the photographer is newly prepared (S26), and the image file is registered under this directory (S27, S28).

Figure 8:
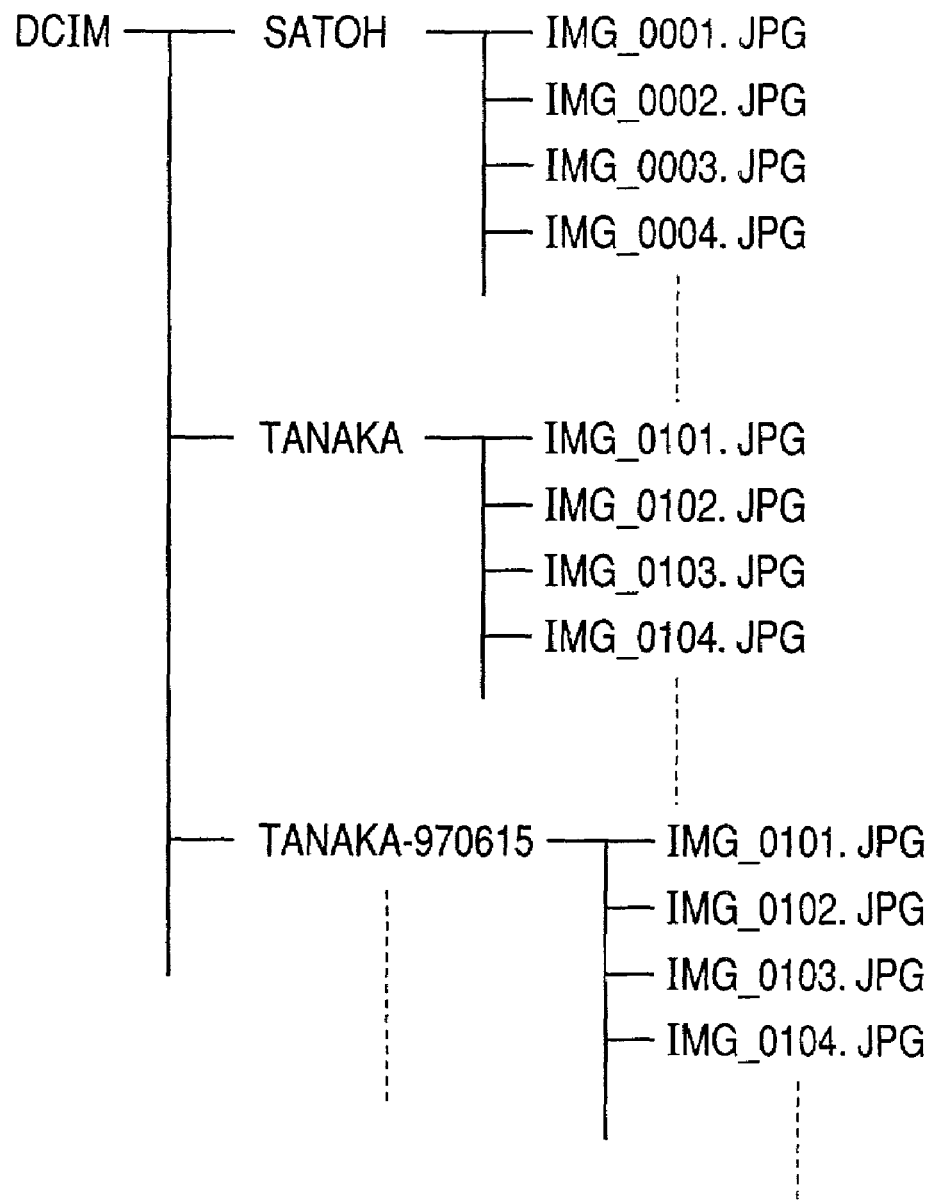
FIG. 8 is a second directory example of the present embodiment.

FIG. 8 is a view showing one example of the file system having the directory name which is characteristic of the photographer. In FIG. 8, the directory name includes the names of the photographers, for example, "SATOH", "TANAKA" or the like. Furthermore, similarly to "TANAKA_970615", any numerical value (for example, photographing date) may be added after the name of the photographer. By using a directory having high correlation with the photographer, even when one image pickup apparatus or recording medium is commonly used by a plurality of persons, it is possible to easily recognize in which directory the image file photographed by each user is recorded, by just confirming the directory name, thereby making it easy to manage the photographed image data.

A list of directory names shown in FIG. 8 can be displayed on the display portion 28 from the menu screen by operating the operation key 24.

Figure 9:
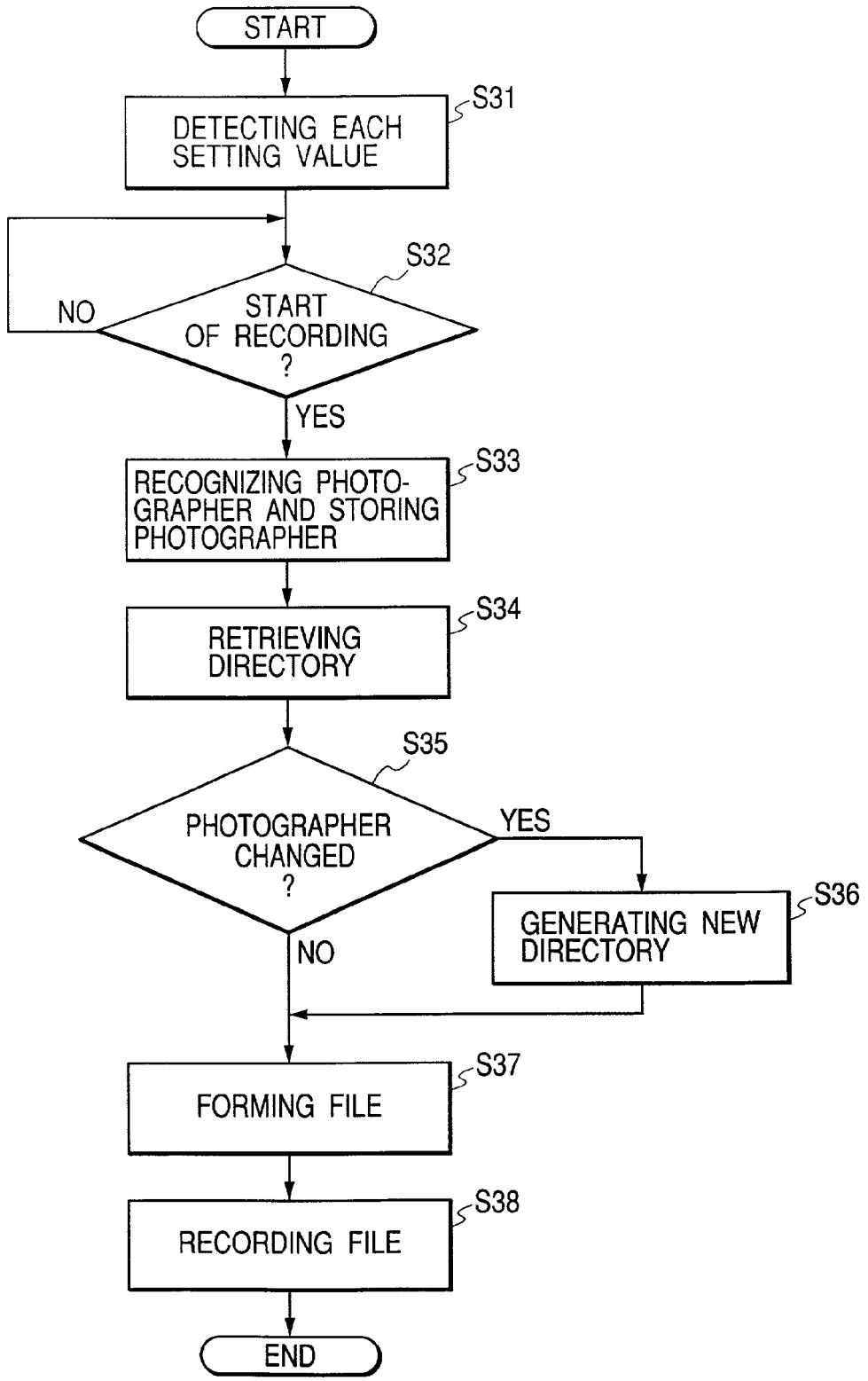
FIG. 9 is the operational flowchart of the present embodiment.

FIG. 9 is still another operational flowchart of the present embodiment. In the operation of FIG. 9, when the change in the photographer is detected, a directory is newly prepared and the image file is recorded under this directory.

In FIG. 9, setting values are detected (S31), and the start of the photographing is awaited (S32). When the instruction to start the photographing is received (S32), the photographer is recognized and specified by the photographer recognizing portion 46 and stored in the memory (S33). Next, the information of the directories of the recording medium 36 is obtained (S34), and the attribute of the directory in which the file recorded immediately before among recorded files is recorded is compared with the present photographer (S35). When the photographer is the same, the image file is recorded under the same directory as before (S37, S38) and, when different, a directory of the photographer specified this time is newly prepared (S36), and the image file is recorded under this directory (S37, S38).

The name of the directory to be newly prepared is turned into, for example, the name for specifying the present photographer, or the name linking the dates or any numerical values, or the name linking the position information or the like detected by the position detection portion 48. The directory "TANAKA_970615" of FIG. 8 is a directory in which the image that the photographer specified as TANAKA photographed on Jun. 15, 1997 is recorded.

In this way, according to the present embodiment, since a new directory is automatically prepared according to the change in the photographer, the operability is improved and the management of the photographed image can be made easily.

Figure 10:
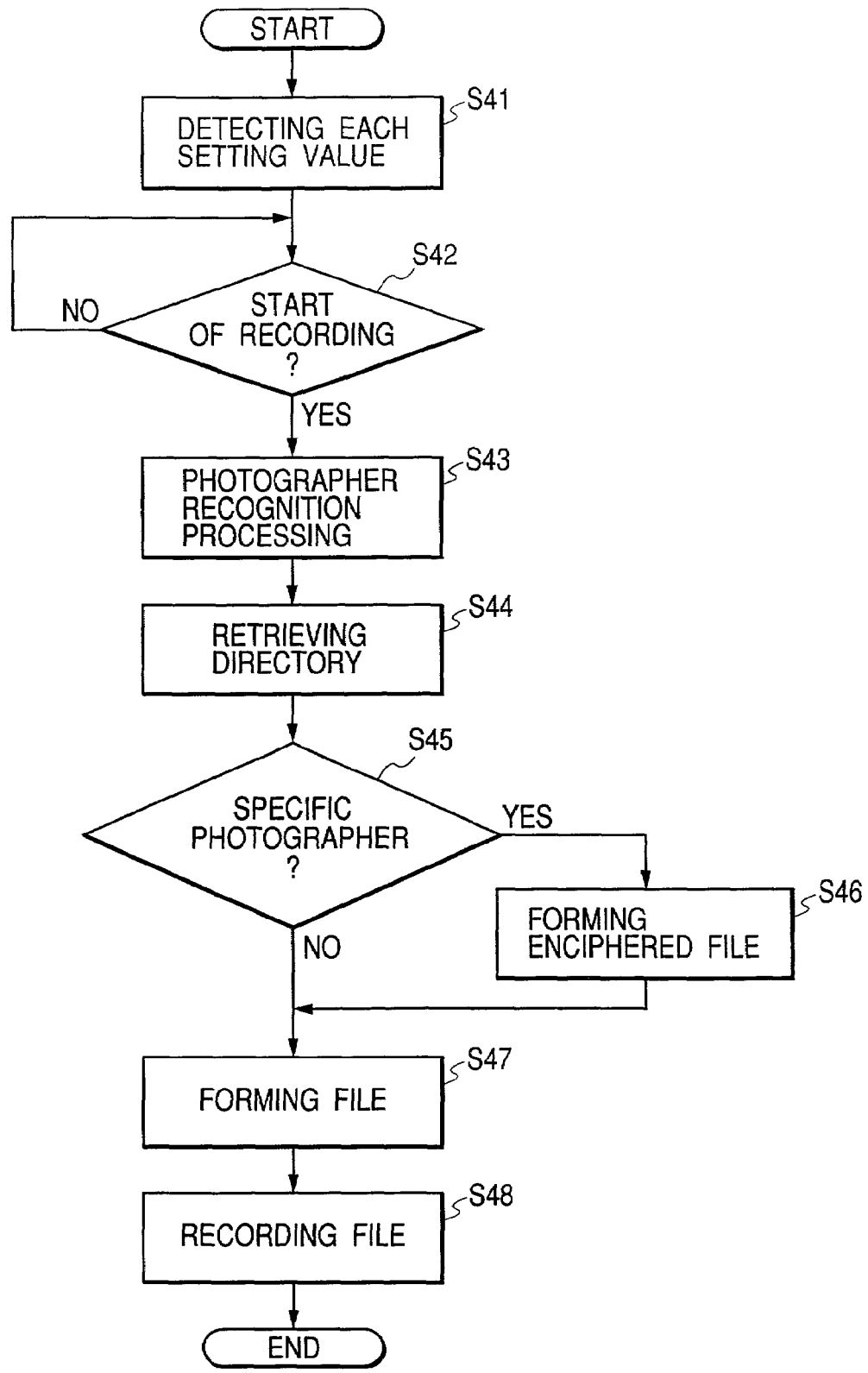
FIG. 10 is the operational flowchart of the present embodiment.

FIG. 10 is still another operational flowchart by the image pickup apparatus 100 of the present embodiment. In FIG. 10, the photographed image by a specified photographer is enciphered and recorded.

In FIG. 10, setting values are detected (S41), and the start of the photographing is awaited (S42). When the instruction to start the photographing is received (S42), the photographer is recognized and specified by the photographer recognizing portion 46 (S43). Next, the directory information of the recording medium 36 is obtained (S44), and whether the photographer is a specified photographer or not is checked (S45). When the photographer is other than the specified photographer, the file thereof is recorded in the recording medium 36 as an ordinary image (S47, S48) and, when the photographer is the specified photographer, an enciphered file is prepared and recorded in the recording medium 36 (S36, S38).

The specified photographer is, for example, the owner of the image pickup apparatus, the supervisor or the specially designated user. In order to set up the specified photographer on the image pickup apparatus, for example, the following steps may be taken. That is, when a specified key of the operation key 24 was operated on the occasion when the photographer was recognized by the photographer recognizing portion 46, the photographer is stored in the memory 42 or the recording medium 36.

As for a method of enciphering the file, there are such method or the like of scrambling the file by using a key code owned by the specified photographer. The enciphered file can be thawed only by using the key code.

Figure 11:
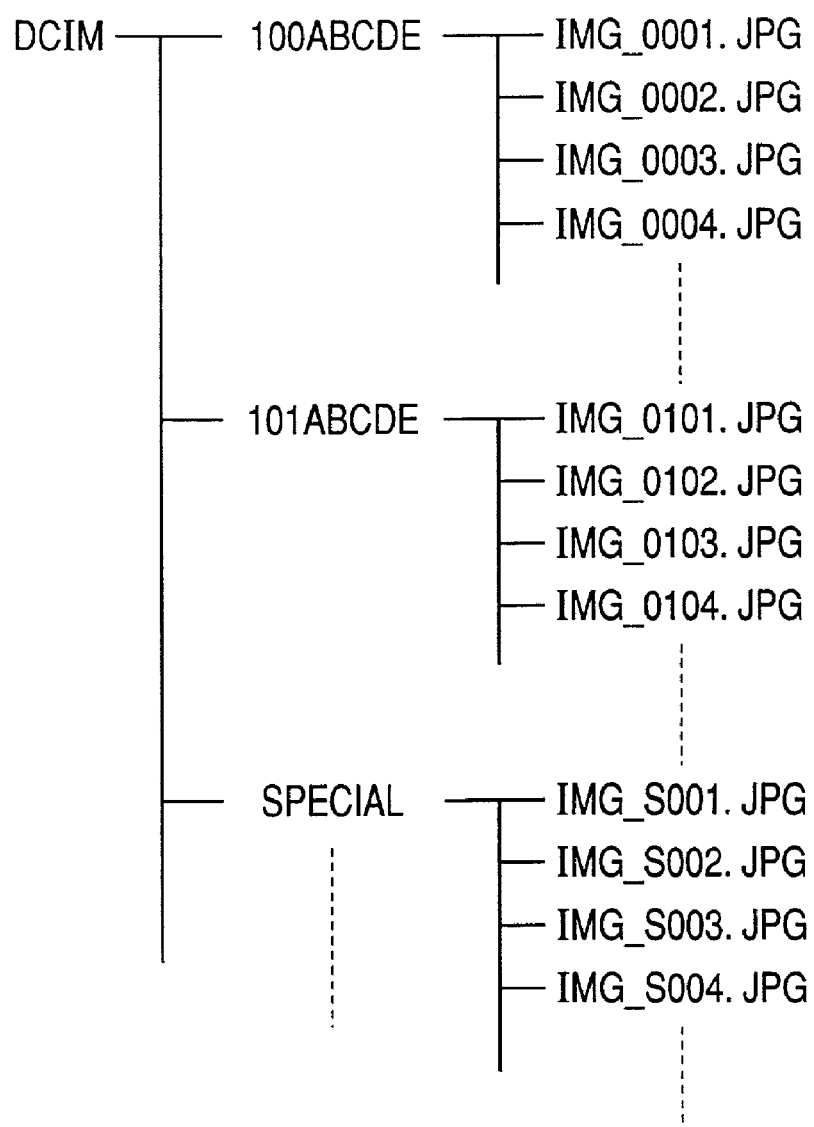
FIG. 11 is a third directory example of the present embodiment.
Figure 12:
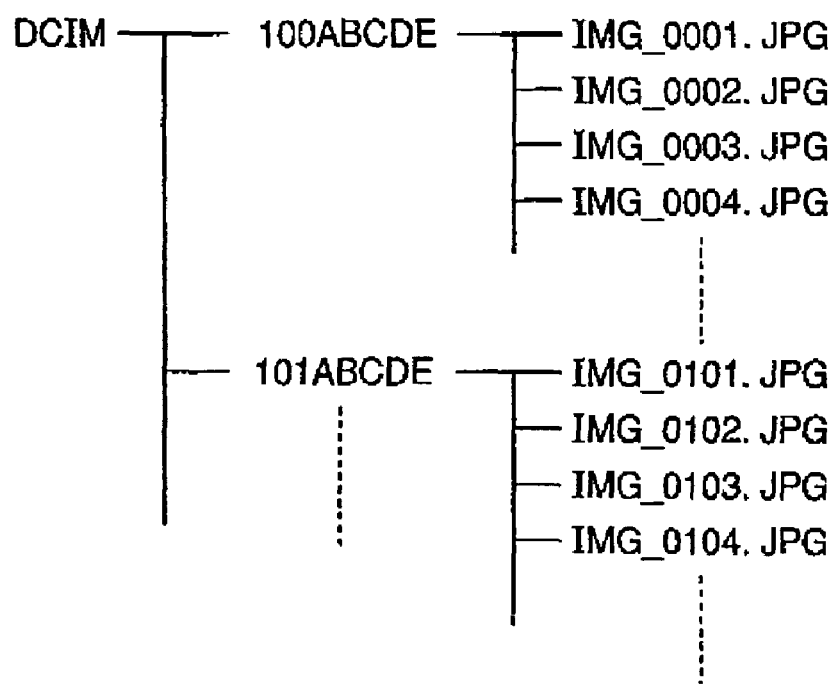
FIG. 12 is a view showing the conventional directory structure.

FIG. 11 is a view showing a state of the directory formed by the operation shown in FIG. 10. "100ABCDE" and "101ABCDE" are the ordinary directories stipulated by the DCF format and, when the photographer other than the specified photographer performs the photographing, the image file is recorded under these directories. In the case of the photographing by the specified photographer, an enciphered file such as the image file "IMG_S001.JPG", "IMG_S002.JPG" and "IMG_S003.JPG" is recorded under the directory having the name of "SPECIAL". The file below the directory "SPECIAL" is enciphered and can be thawed only by a specified key code.

Note that, instead of enciphering the image file photographed by the specified photographer, a limited file attribute, such as reading only, may be set. A copy preventive function may be attached. Furthermore, a file converting method may be selected or stipulated.

In this way, according to the present embodiment, since the photographed image of the specified photographer is automatically enciphered, an individual information can be protected.

Although the operations of the present embodiment have been described as above, it is possible to combine and utilize the operations shown in FIGS. 5, 6, 7, 9 and 10.

Many widely different embodiments of the present invention may be constructed without departing from the spirit and scope of the present invention. It should be understood that the present invention is not limited to the specific embodiments described in the specification, except as defined in the appended claims.

What is claimed is:

1. An image pickup apparatus, comprising:
   image pickup means;
   recording means for allotting image data to a plurality of groups corresponding to the photographers of the image data and recording the image data on the recording medium according to the allotted group, a plurality of image data being allotted to each of the plurality of groups;
   fingerprint detection means for detecting a fingerprint of the photographer;
   photographer discrimination means for discriminating the photographer of the image data newly photographed by said image pickup means in accordance with the fingerprint detected by said fingerprint detection means; and
   control means for detecting the group corresponding to the photographer discriminated by said photographer discrimination means among said plurality of groups where the image data are already allotted and for controlling said recording means so as to record the newly photographed image data by allotting the newly photographed image data to the detected group.

2. An apparatus according to claim 1, wherein said control means controls said recording means so as to allot the newly photographed image data to the group having the name of a photographer discriminated by said photographer discrimination means among said plurality of groups.

3. An apparatus according to claim 1, wherein said control means forms a new group corresponding to the discriminated photographer when there exists no group corresponding to the photographer discriminated by said photographer discrimination means among said plurality of groups, and controls said recording means so as to allot the newly photographed image data to the newly formed group.

4. An apparatus according to claim 1, wherein said control means controls said recording means so as to form a new group corresponding to the discriminated photographer according to that the discriminated photographer has changed from the photographer of the image data photographed by said image pickup means immediately before the newly photographed image data.

5. An apparatus according to claim 1, further comprising a display unit,
   wherein said control means displays the information showing the name of the photographer corresponding to said plurality of groups on said display unit.

* * * * *